(12) United States Patent
Ohta et al.

(10) Patent No.: US 7,441,627 B2
(45) Date of Patent: Oct. 28, 2008

(54) VEHICLE CONTROL SYSTEM

(75) Inventors: Takayuki Ohta, Okazaki (JP); Shinji Takeuchi, Okazaki (JP); Minekazu Momiyama, Chiryu (JP); Hiroaki Kato, Hekinan (JP); Tsuyoshi Murakami, Handa (JP)

(73) Assignee: Jtekt Corporation, Osaka (JP)

( * ) Notice: Subject to any disclaimer, the term of this patent is extended or adjusted under 35 U.S.C. 154(b) by 428 days.

(21) Appl. No.: 11/134,835

(22) Filed: May 20, 2005

(65) Prior Publication Data

US 2005/0257988 A1   Nov. 24, 2005

(30) Foreign Application Priority Data

May 21, 2004   (JP)   ............... 2004-151242

(51) Int. Cl.
   *B62D 5/04*   (2006.01)
(52) U.S. Cl. ............ 180/446; 280/93.506; 701/41
(58) Field of Classification Search ............ 280/93.506; 701/41, 42, 43; 180/446, 444
   See application file for complete search history.

(56) References Cited

U.S. PATENT DOCUMENTS

| | | | |
|---|---|---|---|
| 4,715,466 A * | 12/1987 | Ishii et al. | ............. 180/233 |
| 4,768,602 A | 9/1988 | Inoue et al. | |
| 4,949,265 A * | 8/1990 | Eguchi et al. | ............. 701/42 |
| 5,259,476 A * | 11/1993 | Matsuno et al. | ............. 180/197 |
| 5,332,059 A * | 7/1994 | Shirakawa et al. | ......... 180/197 |
| 7,257,474 B2 * | 8/2007 | Kato et al. | .............. 701/41 |
| 2004/0186647 A1 * | 9/2004 | Ono | ............ 701/70 |

FOREIGN PATENT DOCUMENTS

| | | |
|---|---|---|
| EP | 0 311 098 A2 | 4/1989 |
| JP | 11-091604 | 4/1999 |
| JP | 2003-127690 | 5/2003 |

OTHER PUBLICATIONS

European Search Report for EP 05 01 0971 completed Nov. 4, 2005.
Patent Abstracts of Japan for JP11-091604 published Apr. 6, 1999.
Patent Abstracts of Japan for JP2003-127690 published May 8, 2003.

* cited by examiner

*Primary Examiner*—Eric Culbreth
(74) *Attorney, Agent, or Firm*—Darby & Darby P.C.

(57) ABSTRACT

The control system of a vehicle controls the transmission ratio of the steering angle of a steering wheel relative to a turning angle of front wheels based on a drive force distribution ratio. Thus, the performance of the tires on the front wheels can be used to almost maximum potential, providing effective prevention of understeering.

11 Claims, 7 Drawing Sheets

VEHICLE CONTROL SYSTEM

INCORPORATION BY REFERENCE

The present application claims priority under 35 U.S.C. §119 to Japanese Patent Application No. 2004-151242 filed on May 21, 2004. The content of the application is incorporated herein by reference in its entirety.

BACKGROUND OF THE INVENTION

The present invention relates to a vehicle control system having a transmission ratio between a steering wheel and front wheels that changes according to a running state of the vehicle.

An example of a conventional vehicle control system of this type is one in which a transmission ratio between the steering wheel and the front wheels changes according to the vehicle velocity (see Japanese Laid-Open Patent Publication Number Hei 11-91604, Section [0020]). In another example, the vehicle can switch between two-wheel drive and four-wheel drive based on the operating state (see Japanese Laid-Open Patent Publication 2003-127690, Section [0002] and FIG. 1).

In a vehicle control system developed by the present applicants, various information relating to the operating status of the vehicle is used to detect (or estimate) the grip factor of the front wheels and to determine if there is understeering. If there is understeering and an insufficient grip factor, the transmission ratio is changed so that the same steering operation magnitude results in a small amount of steering in the front wheels, thus preventing understeering from becoming more pronounced.

While the front-wheel grip factor can change in response to a change in the two-wheel/four-wheel drive status, the vehicle control system does not take changes in drive status into account. Thus, when there is a switch to two-wheel or four-wheel drive, a delay takes place in the transmission ratio, making it difficult to effectively limit understeering.

SUMMARY OF THE INVENTION

The present invention overcomes the problems described above and provides a vehicle control system that makes it possible to limit understeering more effectively as compared to conventional technology.

A vehicle control system according to an embodiment of the present invention includes drive distributing means (drive distributor) distributing a drive force from a drive source to a front wheel and a rear wheel so that a distribution ratio can be changed and means for changing a transmission ratio (transmission ratio changer) based on drive force distribution controlling a transmission ratio of a turning angle of the front wheel relative to a steering angle of a steering wheel based on a distribution ratio of the drive force.

The "transmission ratio" in the present invention refers to the "ratio" of the "turning angle of the front wheel relative to the steering angle of the steering wheel" and is defined by the following equation:

[Transmission ratio]=[Turning angle of front wheel]/[Steering angle of steering wheel]

The vehicle control system as described above can include understeering detecting means (understeering detector) detecting understeering and means for changing transmission ratio (transmission ratio changer) based on understeering changing the transmission ratio downward when understeering is detected by the understeering detecting means (understeering detector). When understeering takes place, means for changing transmission ratio (transmission ratio changer) based on drive force distribution corrects a reduction to the transmission ratio performed by means for changing transmission ratio (transmission ratio changer) based on understeering.

In the vehicle control system described above, the means for changing the transmission ratio (transmission ratio changer) based on drive force distribution applies correction so that reduction of the transmission ratio is greater when the drive distribution ratio to the front wheel increases and so that reduction of the transmission ratio is less when the drive distribution ratio to the front wheel decreases.

As shown in FIG. 7, a cornering force Fb (friction) is applied from the road surface in the width axis of a tire in response to the centrifugal force that takes place when cornering. In the tire perimeter direction, there is a drive force Fa (friction) from the road surface due to the drive on the tire. The degree of the grip factor drops the closer the magnitude of the vector sum Fab of the drive force Fa and the cornering force Fb approaches the friction limit Fmax. In other words, the limit of the cornering force Fb to prevent a reduction in the degree of the grip factor is determined from the tire friction limit Fmax and drive force Fa.

Also, it is known that the cornering force Fb of the front wheel and the slip angle (the angle in the turning direction of the wheel relative to the direction of motion of the vehicle—see βf of FIG. 5) of the front wheel establish the relationship shown in the line graph in FIG. 8. More specifically, as the front wheel is turned with a steering operation and the slip angle βf increases, up to a certain point the cornering force increases together with the increase in the slip angle, resulting in the vehicle turning according to the slip angle βf. When the vector sum Fab reaches the limit Fmax or if the slip angle of the front wheel increases, the cornering force Fb is saturated. In other words, despite the driver's intention, turning the steering wheel does not turn the vehicle, thereby resulting in understeering.

With a vehicle in which the drive distribution ratio to the front wheel and the rear wheel is variable, a reduction in the drive distribution ratio to the front wheel also reduces the drive force Fa applied to the front wheel. As shown in FIG. 7, as the drive force Fa of the front wheel is reduced by ΔFa to become Fa', that reduction increases the force that can be used as the cornering force Fb in the friction circle. As a result, the amount of turn of the vehicle can be increased.

The vehicle control system described above takes advantage of how the limit to turning ability changes depending on the drive distribution ratio to the front wheel. Thus, the transmission ratio of the turning angle of the front wheel relative to the steering angle of the steering wheel is controlled based on the drive distribution ratio. As a result, almost full advantage can be taken of the tire performance of the front wheels, and understeering can be limited in an effective manner.

In the vehicle control system described above, if understeering takes place, the means for changing transmission ratio (transmission ratio changer) reduces the transmission ratio in response to the understeering so that even if the steering wheel is operated, the front wheel makes only a relatively small turn. As a result, saturation of the cornering force is restricted and understeering can be limited. Also, means for changing transmission ratio (transmission ratio changer) based on drive force distribution corrects the transmission ratio reduction effected by means for changing transmission ratio (transmission ratio changer) in response to understeering. As a result, when the cornering force limit value in the friction circle changes as a result of a change in distribution ratio, the transmission ratio can be changed quickly in response to the change, making it possible to limit understeering in an effective manner.

More specifically, the cornering force limit value in the friction circle decreases when the drive distribution ratio to the front wheel increases. In such cases, in the vehicle control system described above, the amount of reduction to the transmission ratio is corrected upward so that the front wheel can be turned only by a relatively small amount. This limits understeering. If, on the other hand, the drive distribution ratio to the front wheel is reduced, the cornering force limit value increases. In such cases, the vehicle control system described above corrects the transmission ratio reduction downward so that the front wheel can be turned by a relatively large amount. As a result, the vehicle becomes easier to turn and its path can be changed from an understeering path to a path approaching that of neutral steering.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Referring to FIG. 1 through FIG. 8, an embodiment of the present invention will be described.

Figure 1:
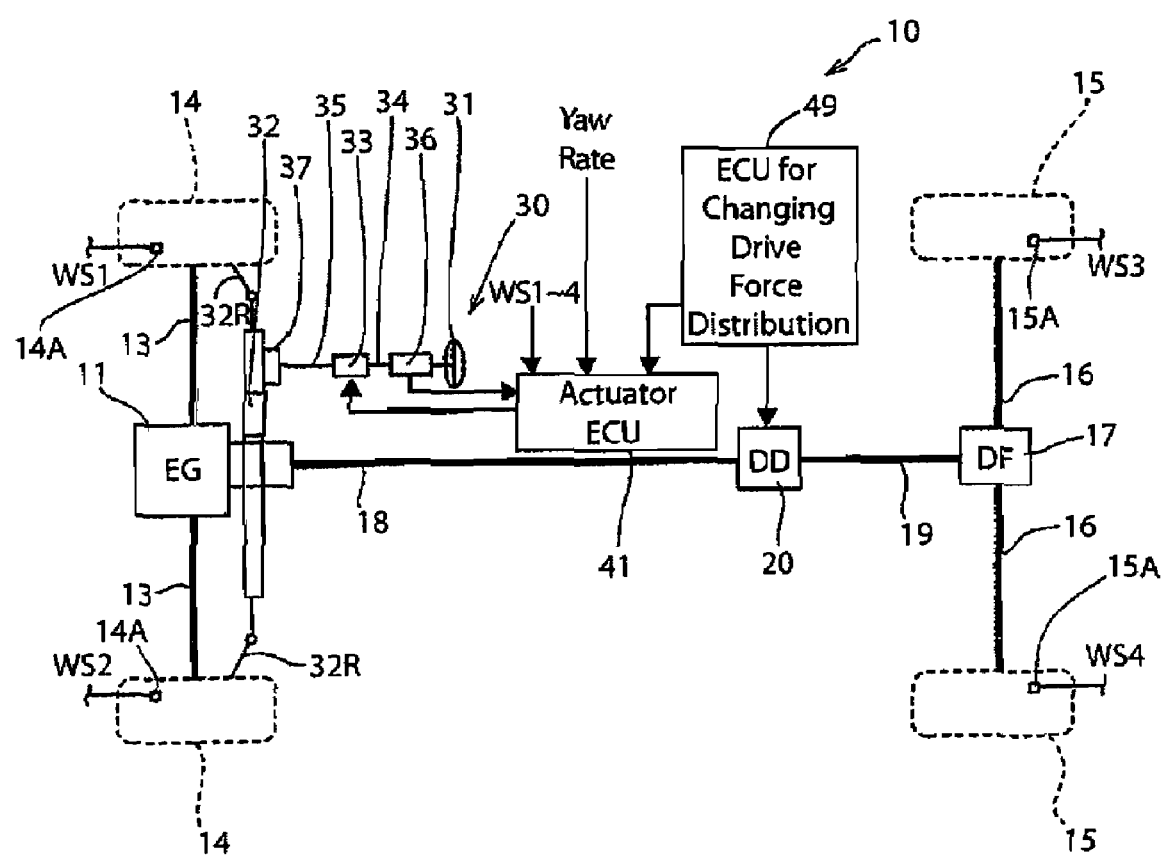
FIG. 1 is a simplified diagram showing a steering system and a drive system according to an embodiment of the present invention.

FIG. 1 shows the main elements of a steering system and a drive system of a vehicle 10 according to an embodiment of the present invention. First, the structure of the drive system will be described. In this vehicle 10, an engine 11 (corresponding to the "drive source" of the present invention) is installed to the front (to the left in FIG. 1). A transaxle (not shown in the figure) is integrated with the engine 11 and includes a transmission, a transfer case, and a front differential. The drive force of the engine 11 is transmitted to front-wheel drive shafts 13, 13 and the front wheels 14, 14 by way of the transmission and the front differential.

The transfer case of the transaxle is connected to the front end of a front propeller shaft 18. The rear end of the front propeller shaft 18 is connected to a rear propeller shaft 19 by way of a clutch 20 (corresponding to the "means for distributing drive" or drive distributor). Furthermore, the rear end of the rear propeller shaft 19 is connected to a rear differential 17. Rear wheels 15, 15 are attached to the ends of rear-wheel drive shafts 16 extending to the left and right from the rear differential 17.

In the clutch 20, the section that is connected to the front propeller shaft 18 serves as the input section and the section connected to the rear propeller shaft 19 serves as the output section. By electronically changing the engagement force of the clutch 20, the distribution of the running drive force transmitted from the engine 11 to the front wheels 14 and the rear wheels 15 can be changed.

The clutch 20 is controlled based on the 4WD (four wheel drive) status determined by an ECU 49 used to change drive distribution. ECU is an acronym for "electric control unit". The 4WD status consists of data relating to the drive distribution ratio to be transmitted from the engine 11 to the front wheels 14 and the rear wheels 15. For example, in normal operation when the vehicle is running straight at a fixed speed, the 4WD status is set so that the drive distribution to the front wheels 14 and the rear wheels 15 is 100:0. This results in the clutch 20 being in a disconnected state in response to the 4WD status, with the distribution ratio of the drive transmission from the engine 11 to the front wheels 14 being 100% while the distribution ratio of the drive transmission from the engine 11 to the rear wheels 15 being 0%. In other words, the vehicle is put in a two-wheel drive state where only the front wheels 14 are driven.

When the ECU 49 detects slippage in the front wheels 14 or the like, the 4WD status is changed from 100:0 to, for example, 50:50. Then, based on this 4WD status, the clutch 20 enters either a "half-clutched" state or a fully connected state. As a result, torque from the engine 11 is transmitted to the rear wheel 15 as well. If the clutch 20 is put in a fully connected state, the drive distribution ratio transmitted from the engine 11 to the front wheels 14 and the rear wheels 15, in this Example, become 50:50, providing a full four-wheel drive state.

Next, the structure of the steering system is described. The steering system 30 of this embodiment includes an electronic power steering device 32 and an actuator 33 for changing the transmission ratio.

Figure 2:
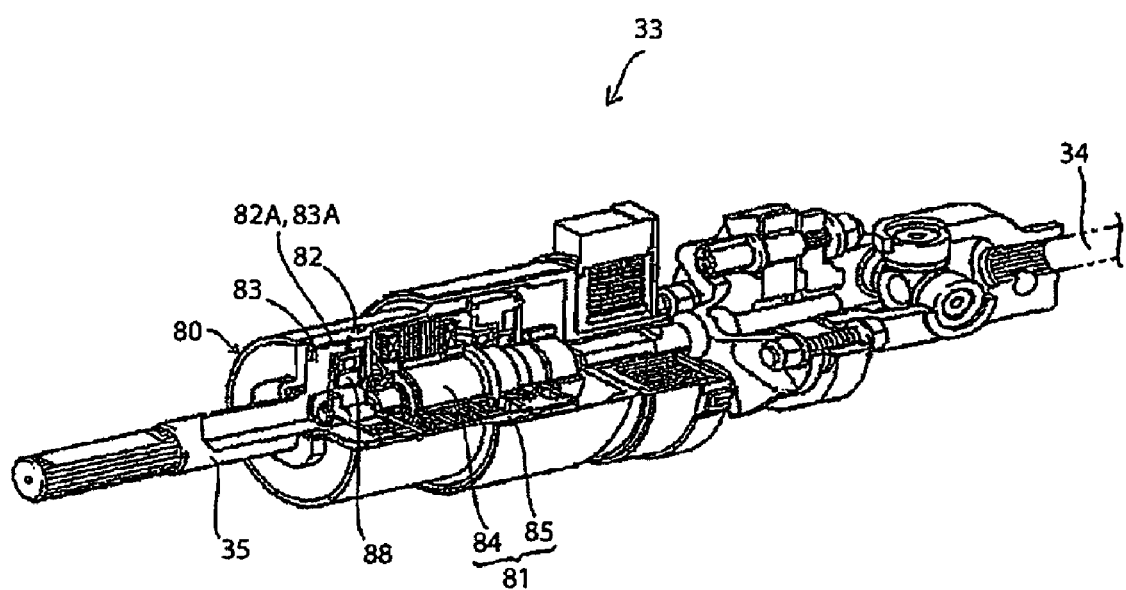
FIG. 2 is a partially cut-away perspective drawing of an actuator according to an embodiment of the present invention.

As shown in FIG. 2, the actuator 33 is formed from a differential speed reducer 80 and a servo motor 81 that drives the speed reducer 80. The speed reducer 80 is equipped with a cylindrical output rotation module 83 inside a cylindrical case 82, with an input rotation module 88 disposed inside of that. A stator 85 of the servo motor 81 is integrated with the cylindrical case 82 of the speed reducer 80, and a rotor 84 of the servo motor 81 is secured to the input rotation section 88. Also, the inner perimeter surface of the cylindrical case 82 and the inner perimeter surface of the output rotation section 83 are formed with differential gear teeth 82A, 83A with different teeth counts. The input rotation section 88 presses against a section of the inner perimeter surface of the output rotation section 83, and the differential gear teeth 82A, 83A mesh against the input rotation section 88 at the pressed section. The rotation of the input rotation section 88 in tandem with the rotation of the rotor 84 changes the meshed section of the differential gear teeth 82A, 83A. Each time the input rotation section 88 makes one rotation, the output rotation section 83 rotates relative to the cylindrical case 82 and the stator 85, with the rotation being determined by the different teeth counts of the differential gear teeth 82A, 83A.

The stator 85 of the servo motor 81 is integrally secured to a steering wheel 31 (see FIG. 1) by way of an input-side steering shaft 34. Also, an output-side steering shaft 35 extends from the output rotation section 83 of the speed reducer 80, and the end of the output-side steering shaft 35 is connected to the input-side pinion gear (not shown in the figure) of the electronic power steering device 32 (see FIG. 1). When the steering wheel 31 is steered, the servo motor 81 is driven so that the input-side and output-side steering shafts 34, 35 turn relative to each other, and the sum of the rotation angle of the steering wheel 31 and the relative rotation of the actuator 33 (hereinafter referred to as the "ACT angle") is applied to an input pinion gear (not shown in the figure) of the electronic power steering device 32.

As shown in FIG. 1, the middle portion of the input-side steering shaft 34 is equipped with a steering angle sensor 36 for detecting the steering angle of the steering wheel 31. The end of the output-side steering shaft 35 is equipped with a torque sensor 37 for detecting steering torque. The input pinion gear described above is rotatably disposed at the axial center of the torque sensor 37.

The electronic power steering device 32 is equipped with a rack shaft that extends along the left/right axis of the vehicle 10, and the input pinion gear described above meshes with a rack gear formed on the rack shaft. Tie rods 32R, 32R, extending from the ends of the rack shaft, are connected to the front wheels 14, 14, respectively. Also, the electronic power steering device 32 is equipped with a servo motor with an opening that passes all the way through its central section. A rotor of this servo motor and the rack shaft are connected with a ball screw mechanism (not shown in the figure). With this structure, the servo motor assists the steering of the steering wheel 31 with the necessary force when the front wheels 14, 14 are to be turned.

Figure 3:
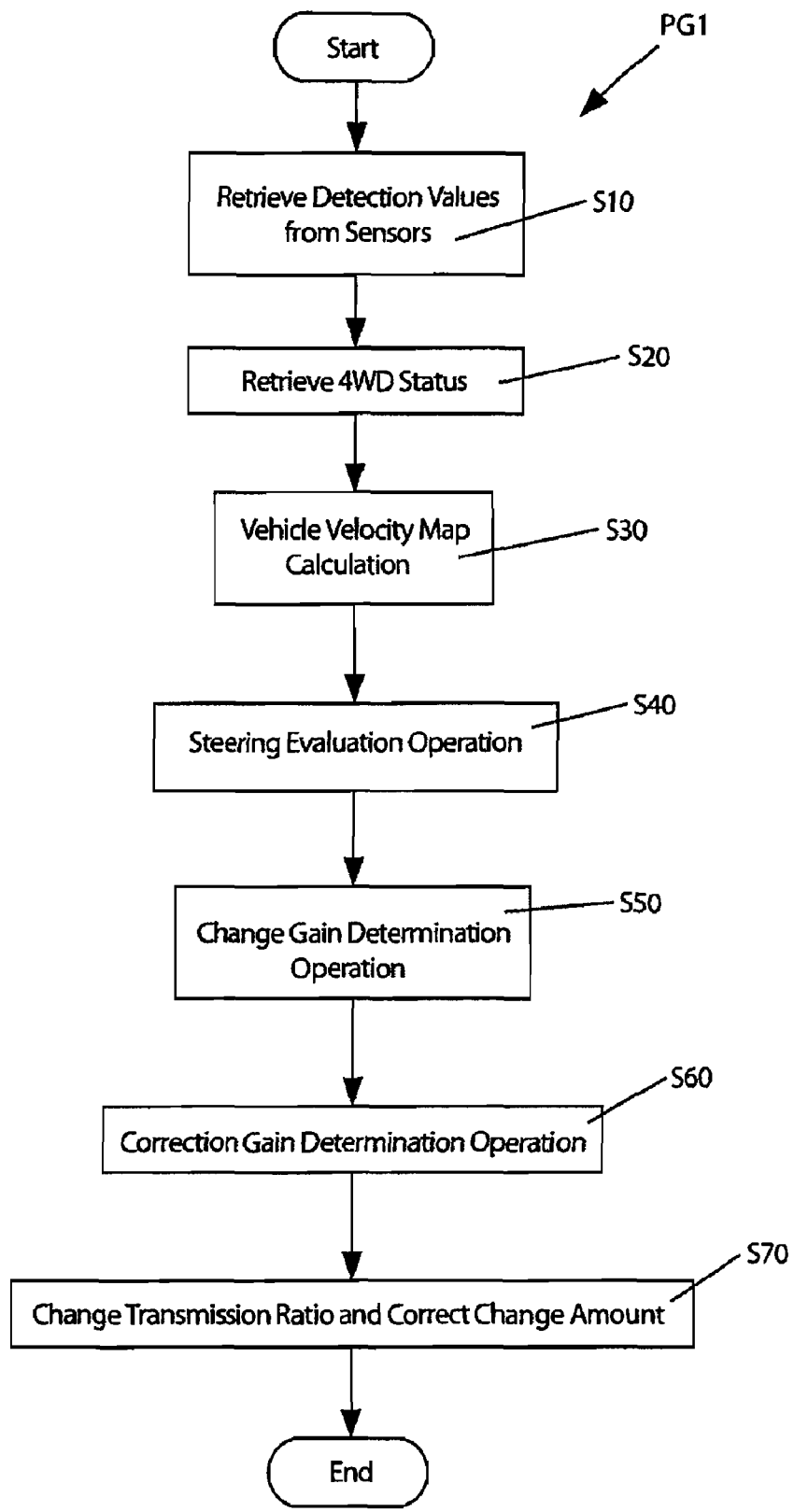
FIG. 3 is a flowchart of a transmission ratio changing program according to an embodiment of the present invention.
Figure 4:
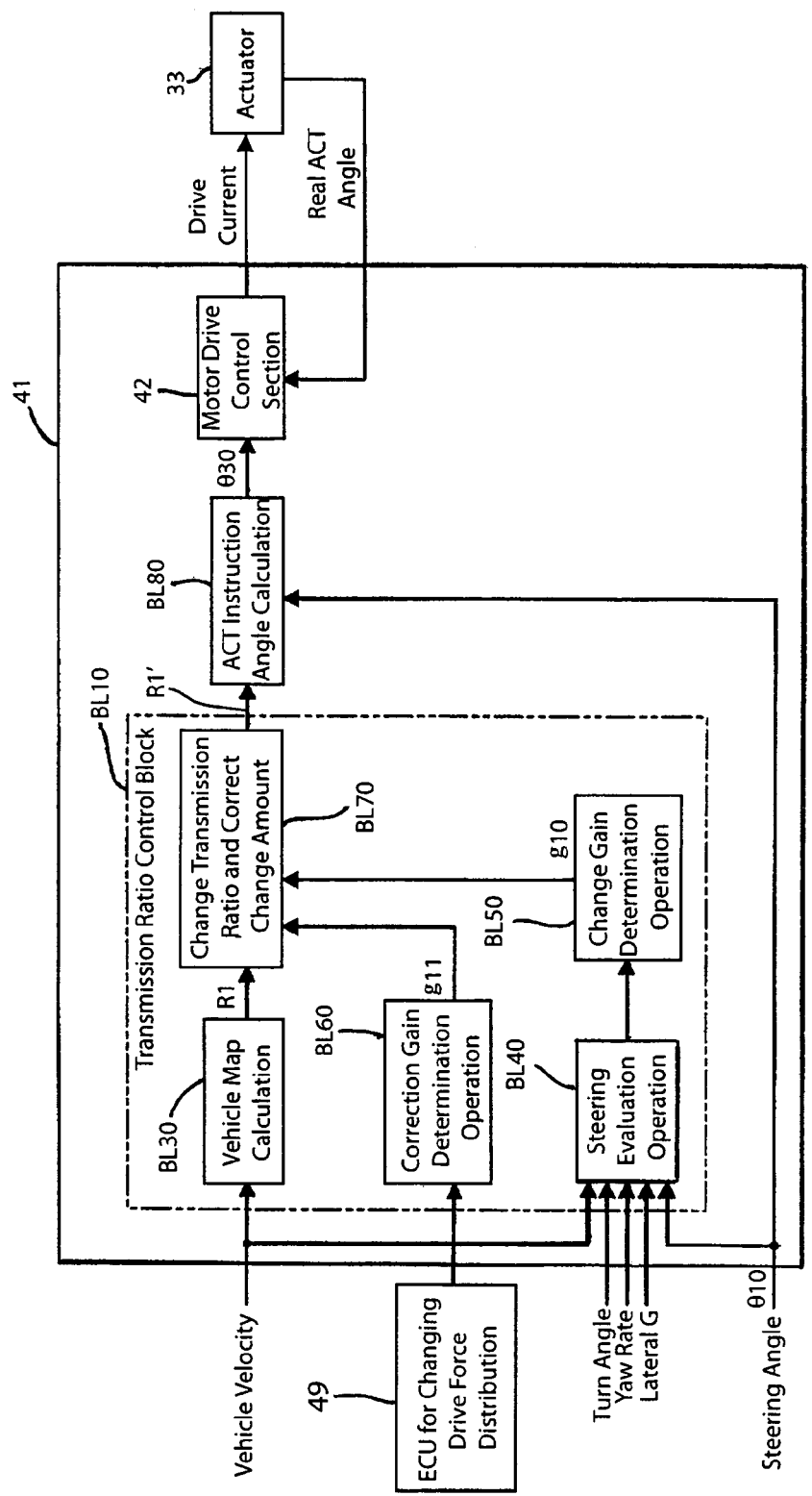
FIG. 4 is a block diagram showing the control structure of an actuator ECU according to an embodiment of the present invention.
Figure 5:
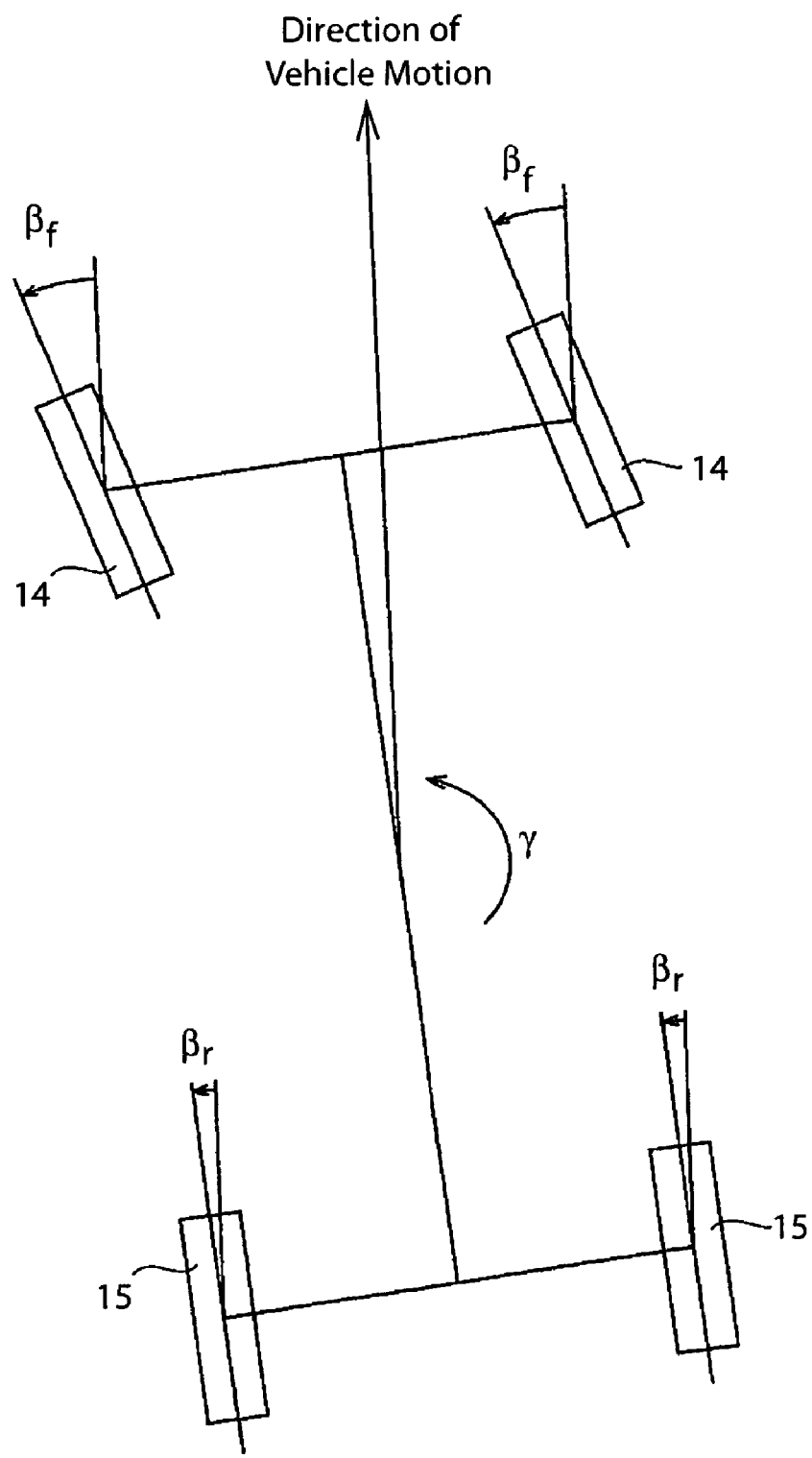
FIG. 5 is a simplified drawing showing front wheel and rear wheel slip angles according to an embodiment of the present invention.

The actuator ECU 41 executes a transmission ratio changing program PG1 shown in FIG. 3 at a predetermined period to perform the operations in a transmission ratio control block BL10 shown in FIG. 4. More specifically, when the transmission ratio changing program PG1 is executed, the actuator ECU 41 captures data such as the vehicle velocity, the steering angle of the steering wheel 31, the turning angle of the front wheels 14, the lateral G, and the yaw rate (S10). Next, a vehicle LAN is used to retrieve the 4WD status from the drive distribution changing ECU 49 (S20).

The vehicle velocity retrieved by the actuator ECU 41 is determined by calculating the average of detection values WS1-WS4 of vehicle velocity sensors 14A, 15A disposed at the front wheels 14 and the rear wheels 15. Also, the steering angle is detected by the steering angle sensor 36, and the turning angle is detected by a resolver installed in the torque sensor 37. Furthermore, the lateral G is detected by an acceleration pickup (not shown in the figure) that is equipped in the vehicle 10. The yaw rate is detected by a yaw rate sensor equipped in the vehicle 10.

When data such as the vehicle velocity and the 4WD status is retrieved, the actuator ECU 41 then performs vehicle speed map calculations (S30, which corresponds to the operations performed in block BL30 in FIG. 4), that uses a vehicle velocity/transmission ratio map to determine a transmission ratio that corresponds to the vehicle velocity. In this embodiment, a transmission ratio R1 is calculated as:

$$\text{Transmission ratio } R1 = \theta 20/\theta 10$$

where $\theta 10$ is the steering angle of the steering wheel 31 and the $\theta 20$ is the turning angle of the front wheels 14. Thus, for larger values of the transmission ratio R1, the amount of steering for the steering wheel 31 needed to turn the front wheels 14 is smaller. For smaller values of the transmission ratio R1, the amount of steering for the steering wheel 31 needed to turn the front wheels 14 is larger. Also, the vehicle velocity/transmission ratio map is set up so that the transmission ratio R1 is smaller for higher vehicle speeds. As a result, when all conditions except vehicle velocity are equal, for the same steering operation on the steering wheel 31, the front wheels 14 turn more at low velocities and the front wheels 14 turn less at higher velocities. Thus, when the transmission ratio R1 increases, the driver, who is steering without being conscious of changes in the transmission ratio R1, turns the front wheels 14 more when the transmission ratio R1 is greater, and turns the front wheels 14 less when the transmission ratio R1 is smaller.

After the vehicle velocity mapping calculation (S30), the actuator ECU 41 performs steering evaluation calculations (S40, which corresponds to the operations performed in block BL40 in FIG. 4 and corresponds to "means for detecting understeering" or understeering detector). An evaluation is made as to whether the vehicle 10 is understeering or not. More specifically, slip angles $\beta f$, $\beta r$ for the front wheels 14 and the rear wheels 15 shown in FIG. 5 (the angle in the direction in which the wheels are turning relative to the direction in which the vehicle 10 is moving) are determined from variables such as the steering angle, the yaw rate (angular velocity at which the vehicle 10 turns), the lateral G, and the vehicle velocity. In this case, the condition $(\beta f - \beta) \cdot \gamma > 0$ is checked, where $\beta f$ is the slip angle of the front wheels 14, $\beta r$ is the slip angle of the rear wheels 15, and $\gamma$ is the yaw rate. If $(\beta f - \beta) \cdot \gamma > 0$, it is assumed that the current running state involves understeering. If the condition is not met, it is assumed that the current running state does not constitute understeering, but constitutes neutral steering or oversteering.

The vehicle 10 of this embodiment is set up so that there is a tendency toward understeering when the tires of the front wheels 14 are at the friction limit. Understeering or oversteering can be set up according to the positioning of the center of gravity of the vehicle 10 and the turning center (neutral steer point). If an oversteering set-up is used, the vehicle can spin, making driving difficult for standard drivers. Therefore, the vehicle 10 of this embodiment is set up for a tendency toward understeering, thereby restricting spinning.

After performing the steering evaluation calculation (S40), the actuator ECU 41 performs change gain determination operations (S50, which corresponds to the operations performed in block BL50 in FIG. 4). Based on a change gain map stored in a ROM (not shown in the figure), a value for change gain g10 for changing the transmission ratio R1 is determined. The change gain map stores separate values for the change gain g10 when there is understeering and when there is neutral steering. More specifically, the understeering values are set to values less than 1, e.g., 0.5-0.9, and the neutral steering values are set, e.g., to 1. If the steering evaluation calculation (S40) determined that the current running state is understeering, the change gain g10 is set to an understeering value. If the current running state is determined to be neutral steering, the change gain g10 is set to a neutral steering value.

After the change gain determination operations (S50), the actuator ECU 41 performs correction gain determination operations (S60, which corresponds to the operations performed in block BL60 in FIG. 4). Using a correction gain map stored in a ROM (not shown in the figure), a value for a correction gain g11 for correcting the change (reduction) in the transmission ratio R1 is determined. This correction gain map stores values for the correction gain g11 associated with the 4WD status described above. This correction gain map is set up so that for smaller drive distribution ratios to the front wheels 14 in 4WD status, the correction gain g11 is larger. More specifically, if the drive distribution ratio to the front wheels 14 is 100%, the correction gain g11 is set, e.g., to 1. Also, as the torque distribution to the front wheels 14 drops from 100%, the correction gain g11 increases to a value greater than 1. If the 4WD status becomes 50%, resulting in complete four-wheel drive status, the correction gain g11 becomes a predetermined value which is greater than 1.

After the correction gain determination operation (S60), the actuator ECU 41 performs an operation to change the transmission ratio and to correct the change (S70, which corresponds to the operations performed in block BL70 in FIG. 4). More specifically, the change gain g10 and the correction gain g11 are multiplied to the transmission ratio R1 determined at the vehicle speed map calculation (S30). If there is understeering, the change gain g10 is a predetermined value less than 1, thus reducing the transmission ratio R1 when the change gain g10 is multiplied to the transmission ratio R1. By multiplying the changed transmission ratio (R1·g10) with the correction gain g11, the transmission ratio R1 is corrected (adjusted) so that it is either reduced significantly or reduced somewhat less. More specifically, if the drive distribution ratio to the front wheels 14 is 100%, the correction gain g11 may be, e.g., 1, so no correction is performed. If the drive distribution ratio to the front wheels 14 is less than 100%, then the correction gain g11 is a predetermined value of 1 or greater, so the reduction from the corrected transmission ratio R1 is less. The transmission ratio R1 is determined, changed and this change is further corrected as described above, so that a final transmission ratio R1' to be used is calculated as R1·g10·g11.

In this embodiment, the transmission ratio change and change correction operations (S70) and the change gain determination operation (S50) correspond to a "means for changing transmission ratio based on understeering" or transmission ratio changer based on understeering of the present invention. The transmission ratio change and change correction operations (S70) and the correct gain determination operation (S60) correspond to "means for changing transmission ratio based on drive distribution" or transmission ratio changer based on drive distribution of the present invention.

When the change and change correction of the transmission ratio (S70) is completed, the transmission ratio changing program PG1 is exited, and the actuator ECU 41 uses the calculated transmission ratio R1' and the steering angle θ10 to determine an ACT instruction angle θ30, which corresponds to the operations performed in block BL80 in FIG. 4. Then, based on the ACT instruction angle θ30, a motor drive control module 42 equipped in the actuator ECU 41 sends a drive current to the servo motor 81 of the actuator 33 to control positioning so that the actual ACT angle matches the ACT instruction angle θ30.

Next, the operations performed by this embodiment having the structure presented above will be described.

Figure 6:
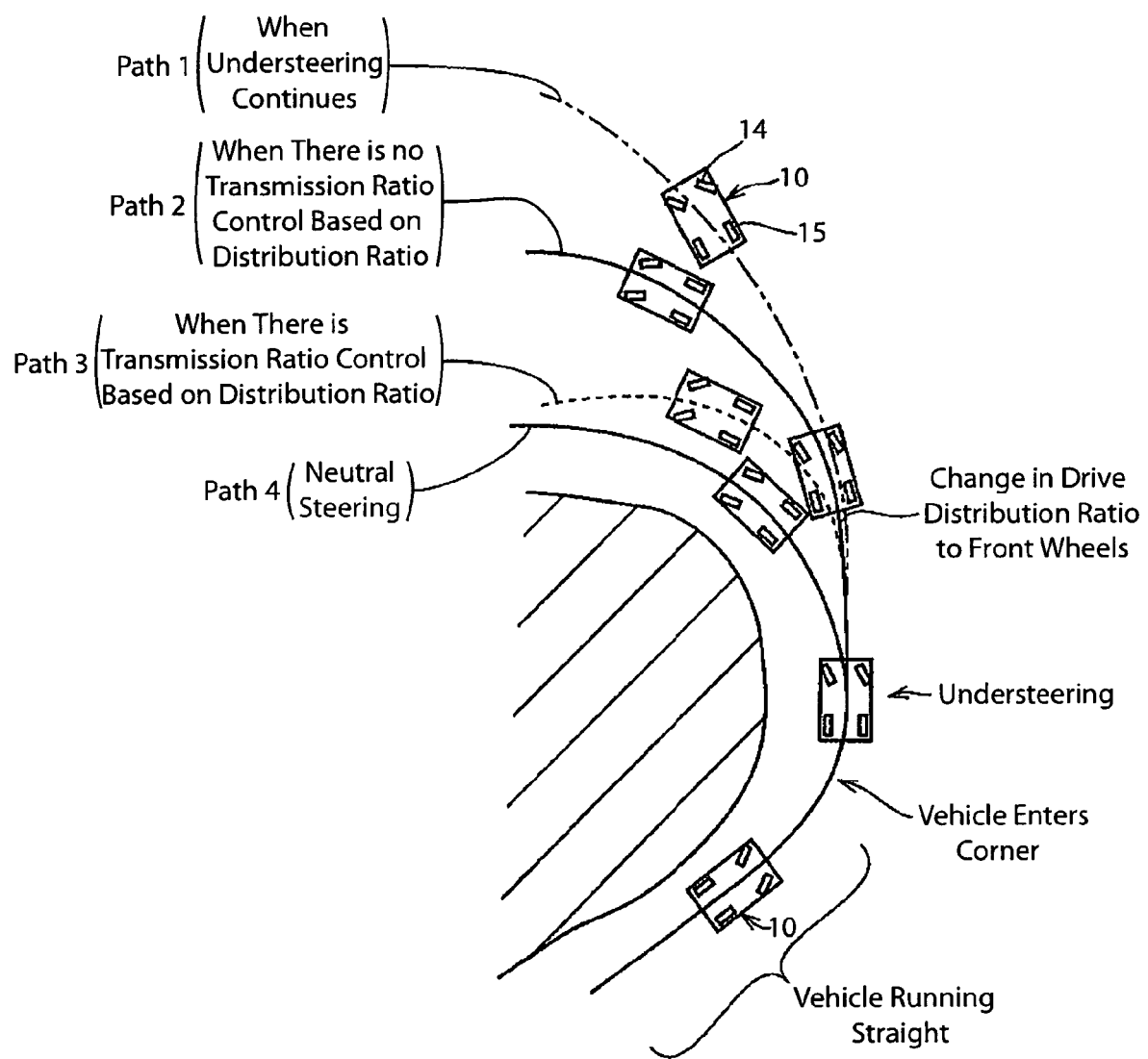
FIG. 6 is a simplified drawing showing paths of a vehicle at a corner according to an embodiment of the present invention.
Figure 7:
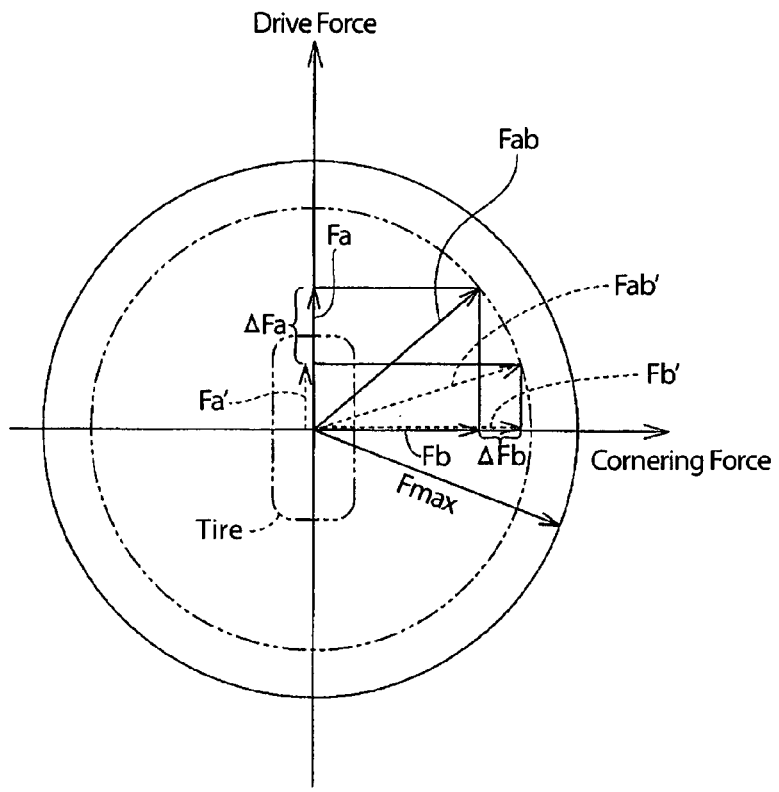
FIG. 7 is a vector line drawing showing the relationship between drive friction force and cornering friction force according to an embodiment of the present invention.
Figure 8:
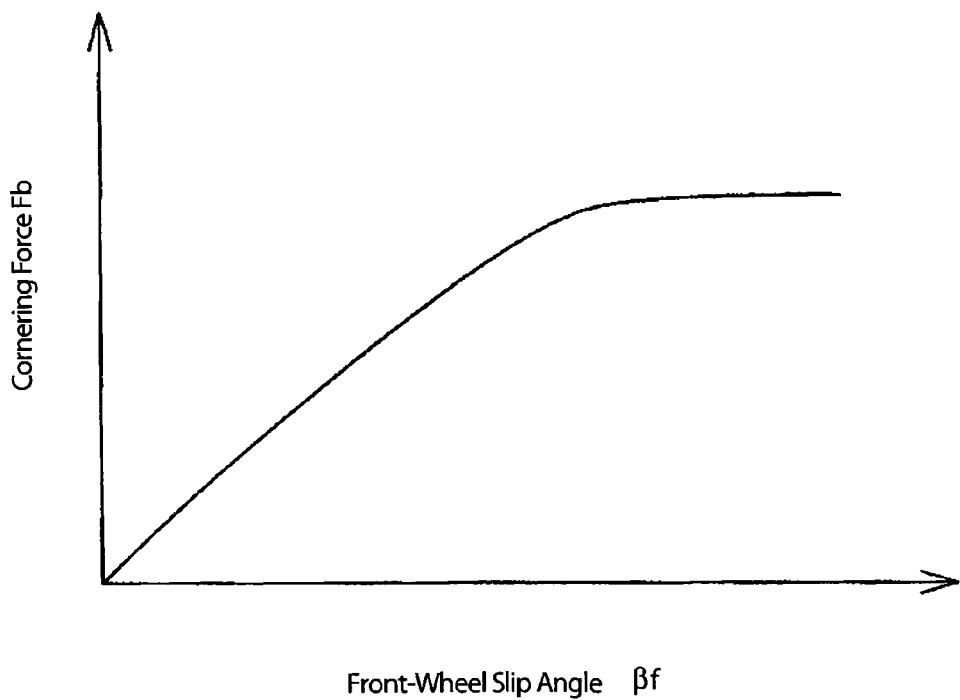
FIG. 8 is a graph showing the relationship between cornering force and slip angle according to an embodiment of the present invention.

FIG. 6 shows the path taken by the vehicle 10 when it passes a corner while running in two-wheel drive. As shown in FIG. 7, when the vehicle 10 reaches the corner, the tires of the front wheels 14 receive a lateral cornering force Fb (friction) from the road surface in response to the centrifugal force involved in the cornering. As shown by the line graph in FIG. 8, as the front wheels 14 are turned with a steering operation and the slip angle βf increases, up to a certain point the cornering force Fb increases together with the increase in the slip angle βf, resulting in the vehicle 10 turning according to the slip angle βf. However, when the vector sum Fab reaches the friction circle limit Fmax or if the cornering force is saturated, increasing the slip angle βf of the front wheels does not increase the cornering force Fb. In other words, despite the driver's intention, turning the steering wheel 31 does not turn the vehicle, thereby resulting in understeering (see path 1 in FIG. 6).

With the vehicle 10 according to this embodiment, the transmission ratio changing program PG1 is executed by the actuator ECU 41 at predetermined intervals, and understeering is detected. Then, when understeering is detected, the transmission ratio R1 between the steering wheel 31 and the front wheels 14 is multiplied by the change gain g10, which has a value of less than 1, thereby changing the transmission ratio R1 downward. As a result, turning the steering wheel 31 by a large amount turns the front wheels 14 by a relatively small amount, thus restricting saturation of the cornering force Fb and limiting understeering (see path 2 of FIG. 6).

When understeering takes place and it is determined that the front wheels 14 are slipping, the drive distribution ratio to the front wheels 14 is reduced. When this is done, the limit value within the friction circle of the cornering force Fb increases by the amount of decrease in the friction from the drive friction force Fa received by the front wheels 14 from the road surface (see FIG. 7). With the vehicle 10 of this embodiment, if the drive distribution ratio to the front wheels 14 is reduced, a correction gain g11 that is 1 or greater is multiplied to the changed transmission ratio (=R1·g10), thus applying a correction that reduces the change (reduction) in the transmission ratio R1. As a result, correction is applied in the direction of turning the front wheels 14 more in response to steering the steering wheel 31. This makes the vehicle more easy to turn and allows the path to change from the understeering path to one approaching neutral steering (see path 4 in FIG. 6).

As described above, the control system of the vehicle 10 according to this embodiment uses the drive distribution ratio to control the transmission ratio of the steering angle of the steering wheel 31 to the turning angle of the front wheels 14. As a result, the tire performance of the front wheels 14 can be taken almost to its limit, and understeering can be limited in an effective manner.

The present invention is not restricted to the embodiment described above. For example, the embodiment described below lies within the technical scope of the present invention. Furthermore, various other changes may be made in the implementation without departing from the scope of the invention.

In the embodiment described above, the product of the transmission ratio R1 with the change gain g10 and the correction gain g11 results in a value less than that of the transmission ratio R1. However, if the drive distribution to the front wheels 14 is at or less than a predetermined value, it would also be possible to have the product of the transmission ratio R1 with the change gain g10 and the correction gain g11 to be a value greater than that of the transmission ratio R1. More specifically, it would be possible for the change gain g10 to be 0.8 and for the correction gain g11 when the drive distribution ratio to the front wheels 14 is less than 75% to be 1.5. The product of the transmission ratio R1 with the change gain g10 (=0.8) and the correction gain g11 (=1.5) would then be 1.2 times the value of the transmission ratio R1.

In the present invention, it is also possible to have a "steer-by-wire" steering system in which the steering wheel 31 and the front wheels are separated mechanically and connected electrically.

In this embodiment, the present invention is implemented in a steering system 30 equipped with an electronic power steering device 32. However, it would also be possible to use a steering system equipped with hydraulic power steering.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle control system comprising:
    a drive force distributor distributing a drive force from a drive source to a front wheel and a rear wheel so that a distribution ratio of said drive force can be changed; and
    a first transmission ratio changer changing a transmission ratio based on said drive force distribution and controlling said transmission ratio of a turning angle of said front wheel relative to a steering angle of a steering wheel based on said distribution ratio of said drive force.

2. A vehicle control system as described in claim 1, further comprising:
    an understeering detector; and
    a second transmission ratio changer changing said transmission ratio based on said understeering and reducing said transmission ratio when said understeering is detected by said understeering detector;
    wherein, when said understeering is detected, said first transmission ratio changer corrects said reduction of said transmission ratio performed by said second transmission ratio changer.

3. A vehicle control system as described in claim 2 wherein said first transmission ratio changer applies a correction so that said reduction of said transmission ratio is greater when said distribution ratio to said front wheel increases and so that said reduction of said transmission ratio is less when said distribution ratio to said front wheel decreases.

4. A vehicle control system comprising:
    means for distributing a drive force from a drive source to a front wheel and a rear wheel so that a distribution ratio of said drive force can be changed; and
    means for changing a transmission ratio based on said drive force distribution controlling said transmission ratio of a turning angle of said front wheel relative to a steering angle of a steering wheel based on said distribution ratio of said drive force.

5. A vehicle control system as described in claim 4, further comprising:
    means for detecting understeering; and
    means for changing said transmission ratio based on said understeering reducing said transmission ratio when said understeering is detected by said means for detecting understeering;
    wherein, when said understeering is detected, said means for changing said transmission ratio based on said drive force distribution corrects said reduction of said transmission ratio performed by said means for changing transmission ratio based on said understeering.

6. A vehicle control system as described in claim 5 wherein said means for changing said transmission ratio based on said drive force distribution applies a correction so that said reduction of said transmission ratio is greater when said distribution ratio to said front wheel increases and so that said reduction of said transmission ratio is less when said distribution ratio to said front wheel decreases.

7. A method for controlling a vehicle comprising the steps of:
    distributing a drive force from a drive source to a front wheel and a rear wheel so that a distribution ratio of said drive force can be changed; and
    controlling a transmission ratio of a turning angle of said front wheel relative to a steering angle of a steering wheel based on said distribution ratio of said drive force.

8. A method for controlling a vehicle as described in claim 7, further comprising the steps of:
    detecting understeering;
    reducing said transmission ratio when said understeering is detected; and
    correcting said reduction of said transmission ratio when said understeering is detected.

9. A method for controlling a vehicle as described in claim 8, further comprising the step of applying a correction so that said reduction of said transmission ratio is greater when said distribution ratio to said front wheel increases and so that said reduction of said transmission ratio is less when said distribution ratio to said front wheel decreases.

10. A vehicle control system comprising:
    a drive force distributor distributing a drive force from a drive source to a front wheel and a rear wheel so that a distribution ratio of said drive force can be changed;
    a first transmission ratio changer changing a transmission ratio based on said drive force distribution and controlling said transmission ratio of a turning angle of said front wheel relative to a steering angle of a steering wheel based on said distribution ratio of said drive force;
    an understeering detector; and
    a second transmission ratio changer changing said transmission ratio based on said understeering and reducing said transmission ratio when said understeering is detected by said understeering detector;
    wherein, when said understeering is detected, said first transmission ratio changer corrects said reduction of said transmission ratio performed by said second transmission ratio changer.

11. A method for controlling a vehicle comprising the steps of:
    distributing a drive force from a drive source to a front wheel and a rear wheel so that a distribution ratio of said drive force can be changed;
    controlling a transmission ratio of a turning angle of said front wheel relative to a steering angle of a steering wheel based on said distribution ratio of said drive force;
    detecting understeering;
    reducing said transmission ratio when said understeering is detected; and
    correcting said reduction of said transmission ratio when said understeering is detected.

* * * * *